US009802492B2

(12) United States Patent
Sikroria et al.

(10) Patent No.: US 9,802,492 B2
(45) Date of Patent: Oct. 31, 2017

(54) VEHICLE DRAG REDUCTION AND ELECTRICITY GENERATION SYSTEM

(71) Applicant: SMART AUTO LABS INC., Huntington, NY (US)

(72) Inventors: Shivam Sikroria, Huntington, NY (US); Siddhant Chouksey, Jabalpur (IN); Shiv Gupta, Jabalpur (IN)

(73) Assignee: SMART AUTO LABS INC., Huntington, NY (US)

( * ) Notice: Subject to any disclaimer, the term of this patent is extended or adjusted under 35 U.S.C. 154(b) by 149 days.

(21) Appl. No.: 14/961,282

(22) Filed: Dec. 7, 2015

(65) Prior Publication Data

US 2017/0158060 A1    Jun. 8, 2017

(51) Int. Cl.
*B60L 8/00* (2006.01)
*B60K 1/04* (2006.01)
*B62D 35/00* (2006.01)

(52) U.S. Cl.
CPC ............. *B60L 8/006* (2013.01); *B60K 1/04* (2013.01); *B62D 35/00* (2013.01)

(58) Field of Classification Search
CPC ... Y02T 10/90; Y02T 10/7083; Y02T 10/705; B60K 2016/006; B60L 8/00; B60L 8/006
See application file for complete search history.

(56) References Cited

U.S. PATENT DOCUMENTS 3,374,849 A * 3/1968 Redman .................. B60K 16/00
180/2.2

3,556,239 A * 1/1971 Spahn ....................... B60K 1/00
180/2.2

(Continued)

FOREIGN PATENT DOCUMENTS

CN    201771672 U    3/2011
CN    204140278 U    2/2015

(Continued)

OTHER PUBLICATIONS

International Search Report and Written Opinion for counterpart International Patent Application No. PCT/US16/60558 dated Jan 24, 2017, 12 pages.

(Continued)

*Primary Examiner* — Bryan Evans
(74) *Attorney, Agent, or Firm* — Moritt Hock & Hamroff LLP; Steven S. Rubin, Esq.

(57) ABSTRACT

A system comprising an air intake structure, a tunnel structure, and an energy generation device is described. The air intake structure may include a first entrance and a first exit. The air intake structure may receive air directed towards the first entrance. A size difference between the first entrance and the first exit may cause a compression of the received air into first compressed air. The tunnel structure may include a second entrance and a second exit. The tunnel structure may receive the first compressed air. A size difference between the second entrance and the second exit may cause a compression of the first compressed air into second compressed air. The energy generation device may receive the second compressed air, and may transform a portion of the second compressed air into energy. The system may further include elements effective to facilitate cooling of components of a vehicle.

23 Claims, 6 Drawing Sheets

(56) References Cited

U.S. PATENT DOCUMENTS

| | | | |
|---|---|---|---|
| 4,254,843 A | * | 3/1981 | Han .................. B60K 1/00 180/165 |
| 4,460,055 A | | 7/1984 | Steiner |
| 4,632,205 A | | 12/1986 | Lewis |
| 5,280,827 A | | 1/1994 | Taylor et al. |
| 5,322,340 A | | 6/1994 | Sato et al. |
| 5,584,355 A | | 12/1996 | Burns |
| 5,986,429 A | | 11/1999 | Mula, Jr. |
| 6,138,781 A | | 10/2000 | Hakala |
| 6,685,256 B1 | | 2/2004 | Shermer |
| 6,857,492 B1 | | 2/2005 | Liskey et al. |
| 6,882,059 B1 | | 4/2005 | DePaoli |
| 7,147,069 B2 | | 12/2006 | Maberry |
| 7,347,294 B2 | | 3/2008 | Gonzalez |
| 7,641,005 B2 | | 1/2010 | Cong |
| 7,665,554 B1 | | 2/2010 | Walsh |
| 7,854,278 B2 | | 12/2010 | Kaufman |
| 8,191,955 B2 | | 6/2012 | August |
| 8,274,169 B2 | | 9/2012 | Schopf |
| 8,359,864 B2 | | 1/2013 | Cong |
| 8,476,863 B2 | | 7/2013 | Paasch |
| 8,627,913 B1 | | 1/2014 | Otterstrom |
| 8,646,550 B2 | | 2/2014 | Penev |
| 8,770,649 B2 | | 7/2014 | Praskovsky et al. |
| 8,777,297 B2 | | 7/2014 | Meredith et al. |
| 2002/0153178 A1 | | 10/2002 | Limonius |
| 2009/0314567 A1 | | 12/2009 | Harrington |

FOREIGN PATENT DOCUMENTS

| | | |
|---|---|---|
| TW | M466831 U | 12/2013 |
| WO | 2010124659 A1 | 11/2010 |
| WO | 2011160602 A1 | 12/2011 |

OTHER PUBLICATIONS

Gagnon, L., et al., "Simulation of a rotating device that reduces the aerodynamic drag of an automobile", Transactions of the Canadian Society for Mechanical Engineering, Apr. 2011, p. 229-249, v 35, n. 2.

Jory, K., et al., "Computational drag analysis in the under-body for a sedan type car model", International Conference on Energy Efficient Technologies for Sustainability (ICEETS), 2013, p. 765-70.

* cited by examiner

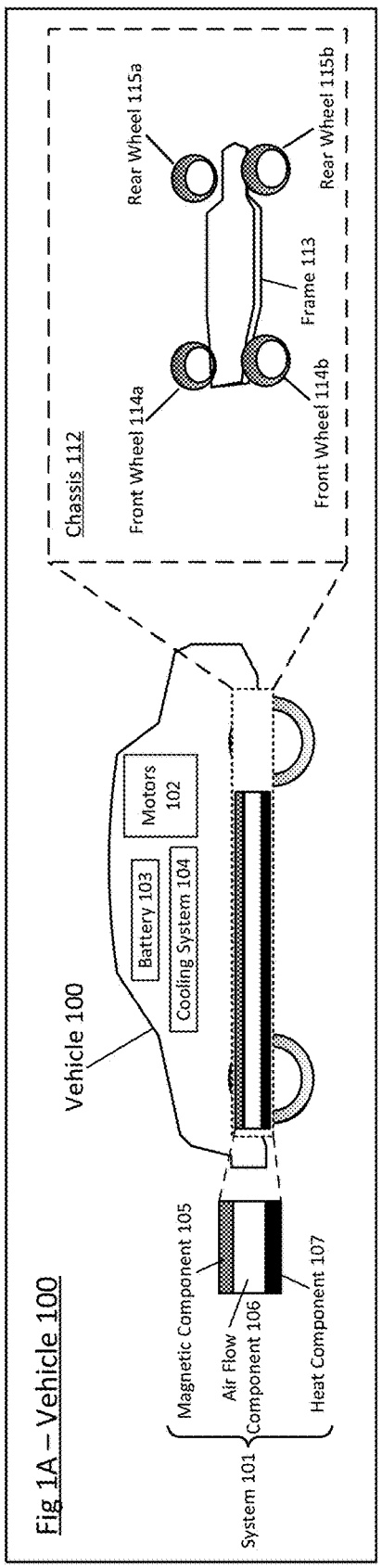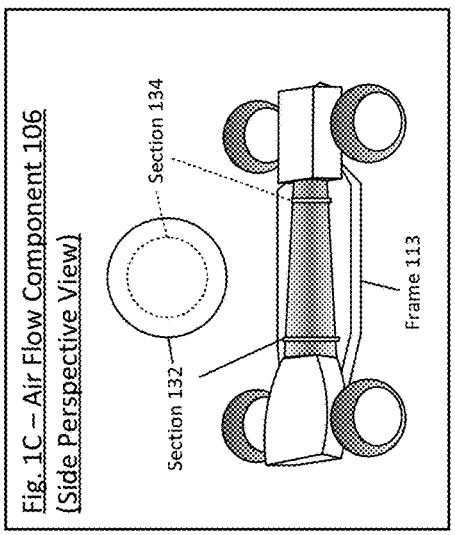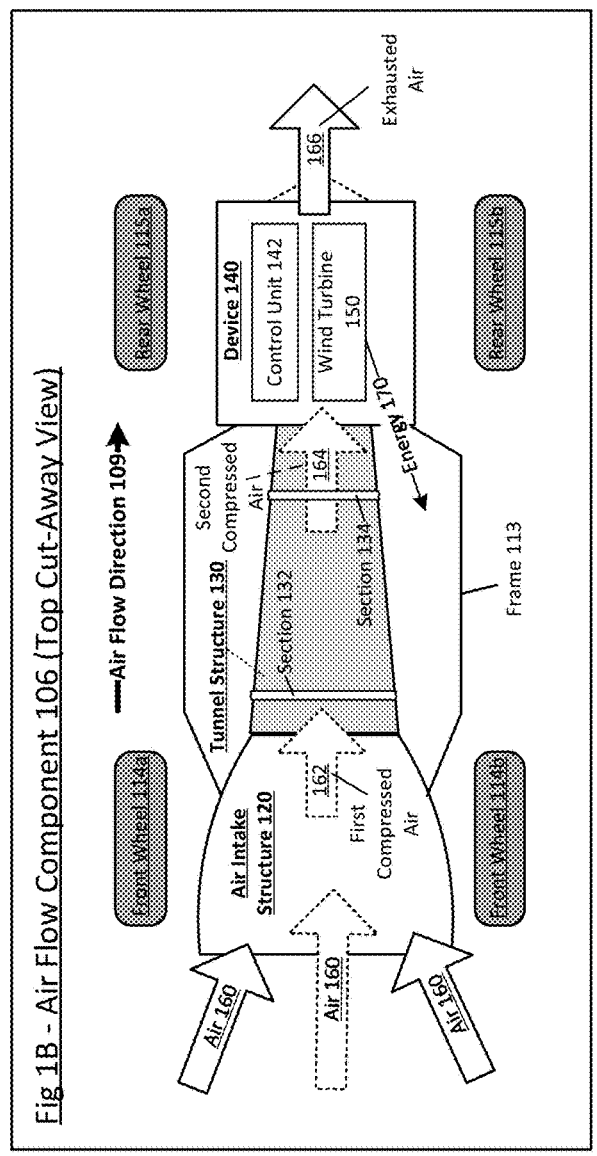

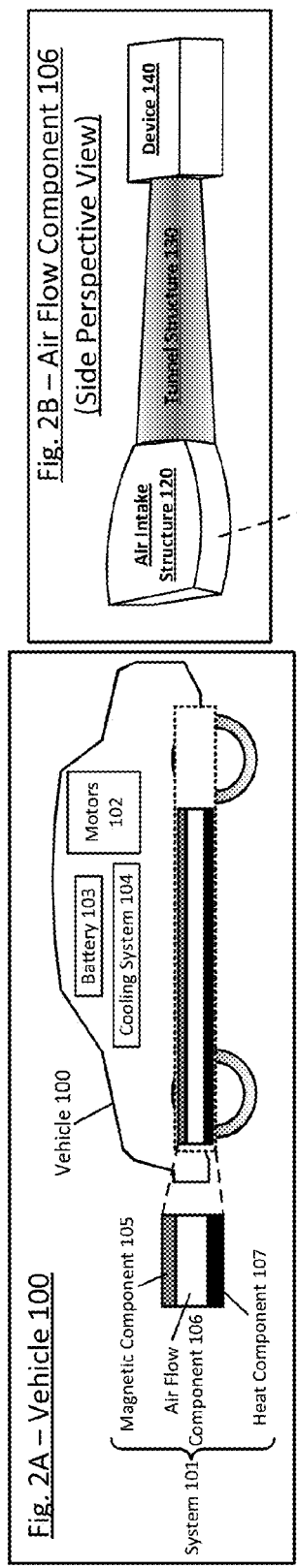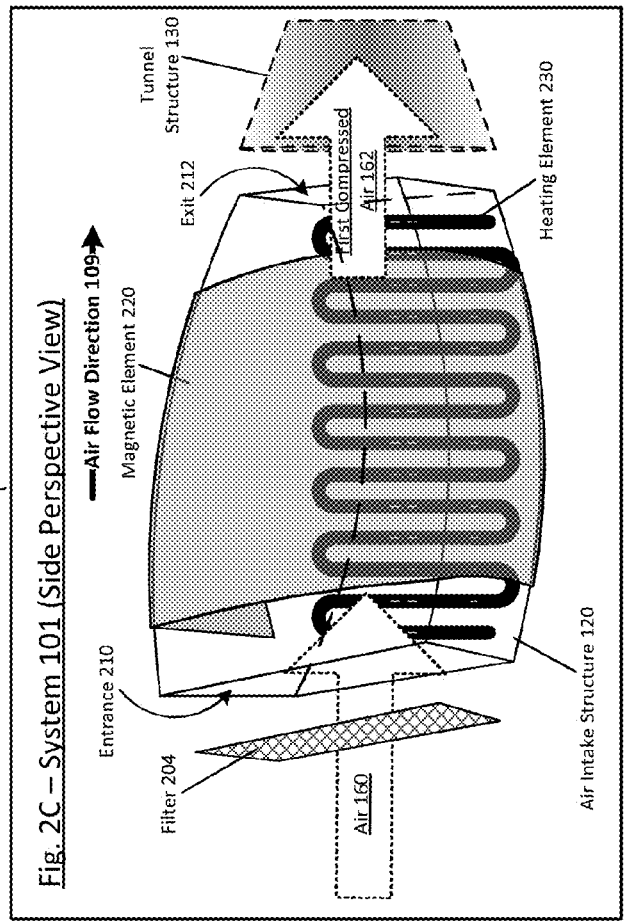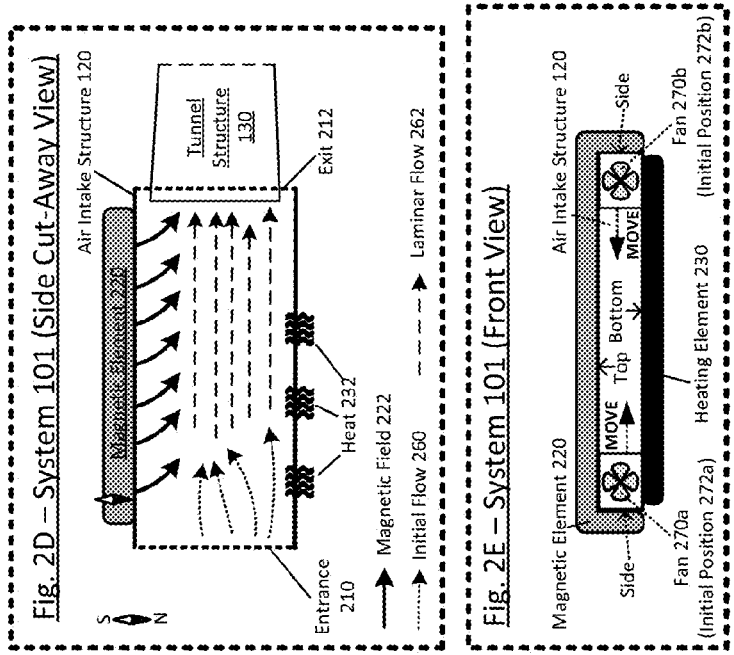

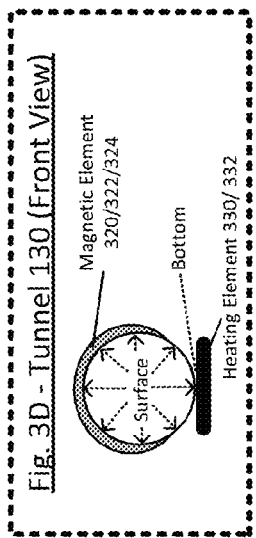
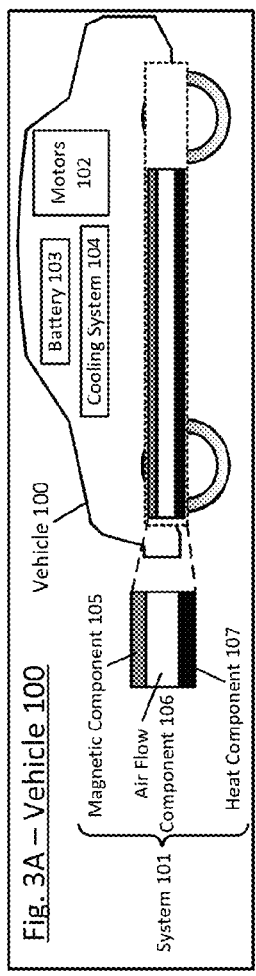
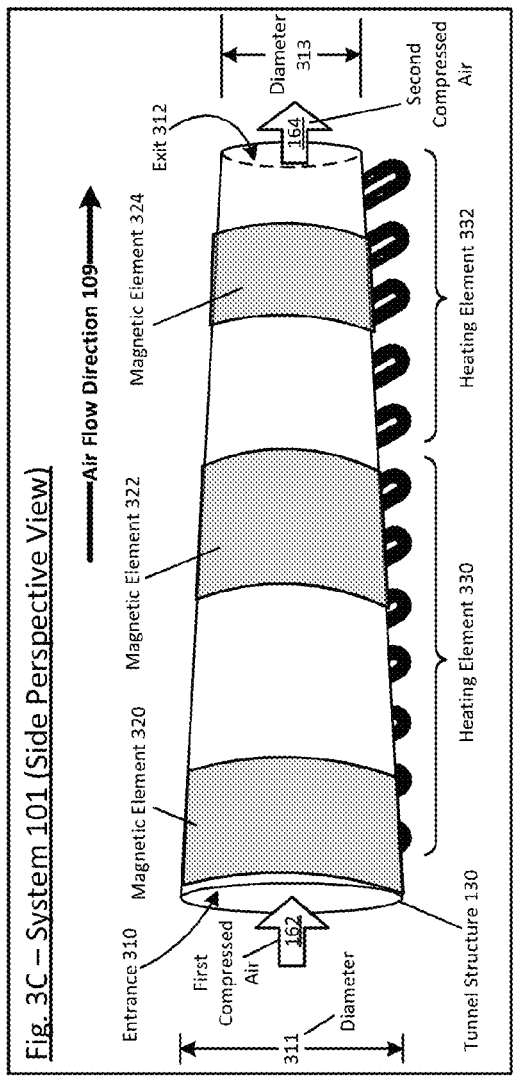
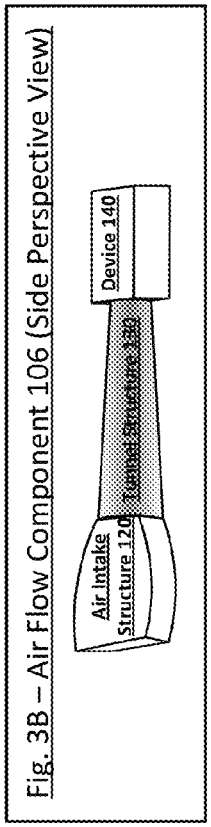
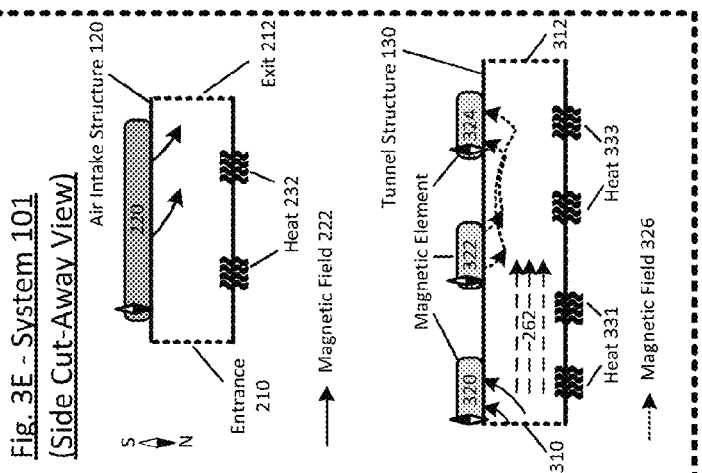

VEHICLE DRAG REDUCTION AND ELECTRICITY GENERATION SYSTEM

BACKGROUND

Unless otherwise indicated herein, the materials described in this section are not prior art to the claims in this application and are not admitted to be prior art by inclusion in this section.

A vehicle in motion may experience a drag resulting from forces acting opposite to the motion of the vehicle. The drag may affect a speed of the vehicle. The vehicle may demand a particular amount of energy to propel the vehicle to reach a desired speed. A reduction of the drag may cause the vehicle to demand less energy to propel the vehicle to the desired speed.

SUMMARY

In some examples, systems including at least an air intake structure, a tunnel structure, and an energy generation device, are generally described. The air intake structure may include a first entrance and a first exit. The air intake structure may be effective to receive air directed towards the first entrance at a first speed. The air intake structure may be curved in a nonlinear manner. A first size of the first entrance may be greater than a second size of the first exit. A first difference between the first size and the second size may be effective to compress the received air into first compressed air of a second speed. The first difference between the first size and the second size may be further effective to cause the second speed to be greater than the first speed. The tunnel structure may be contiguous to the air intake structure. The tunnel structure may include a second entrance and a second exit. The tunnel structure may be curved in a linear manner. The tunnel structure may be effective to receive the first compressed air from the air intake structure at the second speed. A third size of the second entrance may be greater than a fourth size of the second exit. A second difference between the third size and the fourth size may be effective to compress the first compressed air into second compressed air of a third speed. The second difference between the third size and the fourth size may be further effective to cause the third speed to be greater than the second speed. The energy generation device may be configured to be in communication with the tunnel structure. The energy generation device may be configured to receive the second compressed air from the tunnel structure. The energy generation device may be further configured to transform a first portion of the second compressed air into energy. The energy generation device may be further configured to control an exhaustion of a second portion of the second compressed air.

In some examples, vehicles including at least a battery, a motor, a chassis, a transmission, an air intake structure, a tunnel structure, and an energy generation device, are generally described. The motor may be configured to be in communication with the battery. The chassis may include a frame, a set of front wheels coupled to the frame, a set of rear wheels coupled to the frame, and a transmission. The transmission may be coupled to at least one of the set of front wheels and the set of rear wheels. The air intake structure may include a first entrance and a first exit. The air intake structure may be disposed upon a first part of the frame of the chassis. The air intake structure may be positioned between a first wheel and a second wheel among the set of front wheels. The air intake structure may be effective to receive air directed towards the first entrance at a first speed. The air intake structure may be curved in a nonlinear manner. A first size of the first entrance may be greater than a second size of the first exit. A first difference between the first size and the second size may be effective to compress the received air into first compressed air of a second speed. The first difference between the first size and the second size may be further effective to cause the second speed to be greater than the first speed. The tunnel structure may be contiguous to the air intake structure. The tunnel structure may include a second entrance and a second exit. The tunnel structure may be disposed upon a second part of the frame of the chassis. The tunnel structure may be positioned between the set of front wheels and the set of rear wheels. The tunnel structure may be curved in a linear manner. The tunnel structure may be effective to receive the first compressed air from the air intake structure at the second speed. A third size of the second entrance may be greater than a fourth size of the second exit. A second difference between the third size and the fourth size may be effective to compress the first compressed air into second compressed air of a third speed. The second difference between the third size and the fourth size may be further effective to cause the third speed to be greater than the second speed. The energy generation device may be configured to be in communication with the tunnel structure. The energy generation device may be configured to receive the second compressed air from the tunnel structure. The energy generation device may be further configured to transform a first portion of the second compressed air into energy. The energy generation device may be further configured to control an exhaustion of a second portion of the second compressed air.

In some examples, methods to generate electrical energy are generally described. The methods may include receiving, by a vehicle, air directed towards a first entrance of an air intake structure at a first speed. The air intake structure may be disposed upon a chassis of the vehicle. The air intake structure may include the first entrance and a first exit. The air intake structure may be curved in a nonlinear manner. A first size of the first entrance may be greater than a second size of the first exit. The methods may further include compressing, by the vehicle, the received air into first compressed air. A first difference between the first size and the second size may be effective to cause the compression of the received air into the first compressed air. A second speed of the first compressed air may be greater than the first speed of the received air. The first difference between the first size of the first entrance and the second size of the first exit may be further effective to cause the second speed to be greater than the first speed. The methods may further include causing, by the vehicle, the first compressed air to flow from the air intake structure to a tunnel structure. The tunnel structure may be contiguous to the air intake structure. The tunnel structure may include a second entrance and a second exit. The tunnel structure may be disposed upon the chassis of the vehicle. The tunnel structure may be curved in a linear manner. A third size of the second entrance may be greater than a fourth size of the second exit. The methods may further include compressing, by the vehicle, the first compressed air into second compressed air. A second difference between the third size and the fourth size may be effective to cause the compression of the first compressed air into the second compressed air. A third speed of the second compressed air may be greater than the second speed of the first compressed air. The second difference between the third size of the second entrance and the fourth size of the second exit may be further effective to cause the third speed to be greater than the second speed. The methods may further include causing, by the vehicle, the first compressed air to flow from the tunnel structure to an energy generation device. The energy generation device may be configured to be in communication with the tunnel structure. The methods may further include transforming, by the vehicle, a first portion of the second compressed air into energy. The methods may further include controlling, by the vehicle, an exhaustion of a second portion of the second compressed air.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1A illustrates a vehicle relating to a vehicle drag reduction and electricity generation system;

FIG. 1B illustrates a top cut-away view of an air flow component relating to a vehicle drag reduction and electricity generation system;

FIG. 1C illustrates a side perspective view of the air flow component relating to a vehicle drag reduction and electricity generation system;

FIG. 2A illustrates the vehicle of FIG. 1 with additional detail relating to a drag reduction and electricity generation system;

FIG. 2B illustrates a side perspective view of the air flow component of FIG. 1 with additional detail relating to a drag reduction and electricity generation system;

FIG. 2C illustrates a side perspective view of an example system of FIG. 1 with additional detail relating to a drag reduction and electricity generation system;

FIG. 2D illustrates a side cut-away view of the example system of FIG. 1 with additional detail relating to a drag reduction and electricity generation system;

FIG. 2E illustrates a front view of the example system of FIG. 1 with additional detail relating to a drag reduction and electricity generation system;

FIG. 3A illustrates the vehicle of FIG. 1 with additional detail relating to a drag reduction and electricity generation system;

FIG. 3B illustrates a side perspective view of the air flow component of FIG. 1 with additional detail relating to a drag reduction and electricity generation system;

FIG. 3C illustrates a side perspective view of the example system of FIG. 1 with additional detail relating to a drag reduction and electricity generation system;

FIG. 3D illustrates a front cut-away view of the example system of FIG. 1 with additional detail relating to a drag reduction and electricity generation system;

FIG. 3E illustrates a side cut-away view the example system of FIG. 1 with additional detail relating to a drag reduction and electricity generation system;

Figure 4:
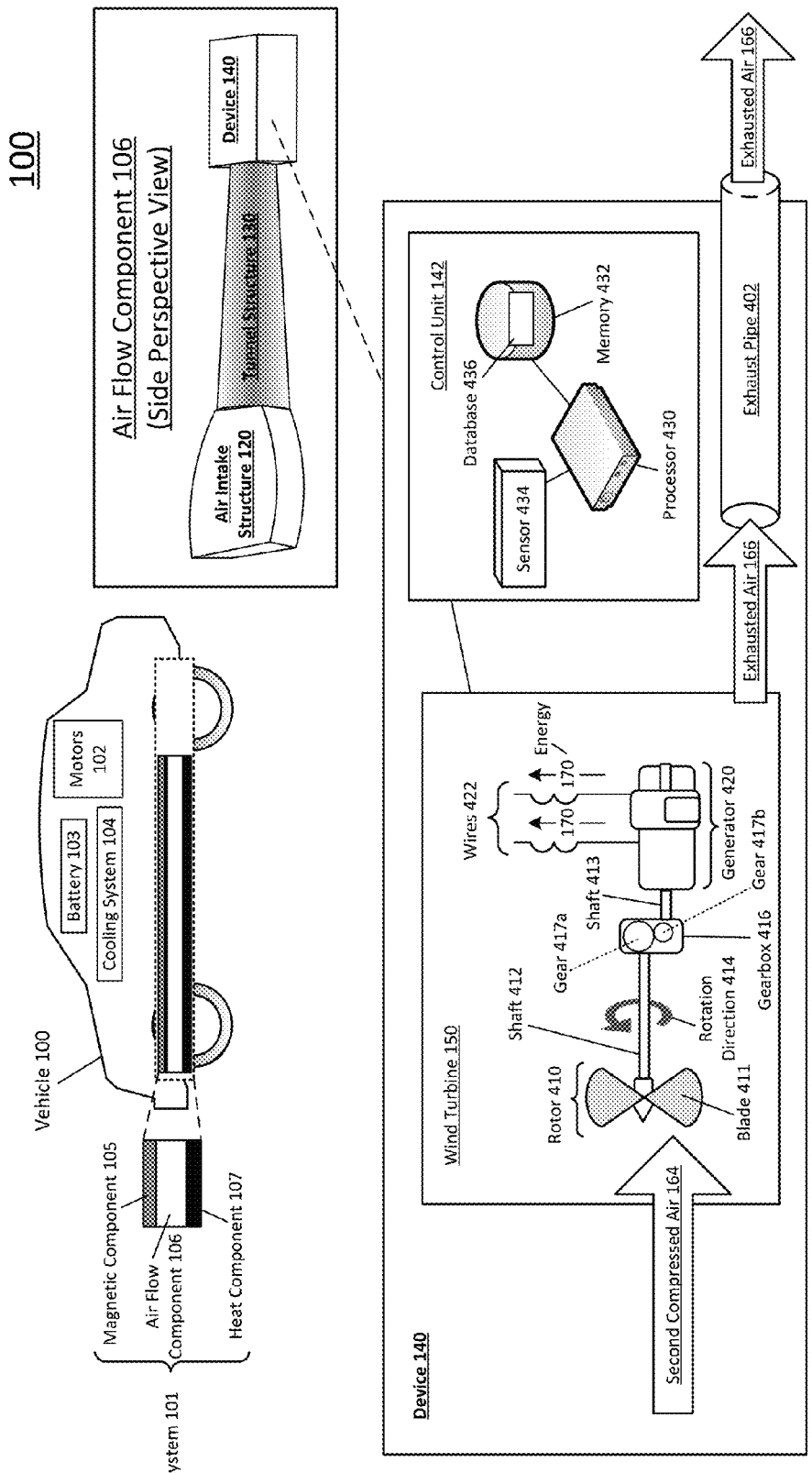
FIG. 4 illustrates the vehicle of FIG. 1 with additional detail relating to a device of a drag reduction and electricity generation system.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1, including FIGS. 1A, 1B, and 1C, illustrates a vehicle, a top cut-away view of an air flow component, and a side perspective view of the air flow component, respectively, related to a vehicle drag reduction and electricity generation system, arranged in accordance with at least some embodiments described herein. Vehicle 100 may include system 101, where system 101 may include components to facilitate generation of electricity (further described below). In some examples, vehicle 100 may be an electric vehicle, a gasoline vehicle, etc. Vehicle 100 may include one or more motors 102, a battery 103, a cooling system 104, and/or chassis 112, etc. In examples where vehicle 100 may be an electric vehicle, motors 102 may be electric motors and may be configured to propel vehicle 100. In some examples where vehicle 100 may be a gasoline vehicle, motors 102 may be associated with a combustion engine of vehicle 100. Battery 103 may be configured to provide power to one or more components, such as motors 102 and cooling system 104, or various electronics of vehicle 100. Cooling system 104 may include one or more units and/or components, such as an air conditioning unit, configured to cool an interior of vehicle 100, one or more radiators configured to cool an engine of vehicle 100, etc. In some examples, cooling system 104 may include components configured to cool motors 102, battery 103, and/or a combustion engine of vehicle 100. Chassis 112 may include a frame 113, front wheels 114a, 114b, and rear wheels 115a, 115b, where front wheels 114a, 114b, and rear wheels 115a, 115b may be coupled to frame 113. In some examples, chassis 112 may include a transmission couple to at least one of front wheels 114a, 114b, and rear wheels 115a, 115b. Frame 113 may be a part of chassis 112, where a body of vehicle 100 may be mounted on frame 113. In some examples, system 101 may be disposed in chassis 112 and may be placed on top of frame 113 of chassis 112, where frame 113 may support a weight of system 101.

System 101 may include a magnetic component 105, an air flow component 106, and a heat component 107. In some examples, at least a part of magnetic component 105 may be disposed upon at least a part of air flow component 106. In some examples, at least a part of air flow component 106 may be disposed upon at least a part of heat component 107.

Magnetic component 105 may include one or more magnetic elements, such as electromagnets, configured to produce respective magnetic fields (further described below). Heat component 107 may include one or more heating elements, such as heat exchanger tubes, configured to provide heat of respective temperatures in system 101 (further described below). Heat exchanger tubes in heat component 107 may include coolant fluids. In examples where vehicle 100 may be an electric vehicle, chassis 112 may define a void sufficiently large enough to house system 101. In examples where vehicle 100 may be a gasoline vehicle with an engine towards a back of vehicle 100, chassis 112 may similarly define a void sufficiently large enough to house system 101.

Focusing on FIG. 1B, air flow component 106 may include one or more structures, such as one or more air intake structures ("air intake") 120 and/or a tunnel structure ("tunnel") 130, where an air intake structure 120 and/or tunnel structure 130 may be configured to be in communication with a device 140. Air intake structure 120 may include walls effective to define an opening, such that air intake structure 120 may be effective to receive air 160, where air 160 may be air directed towards vehicle 100 and/or an entrance of air intake structure 120. In some examples, air intake structure 120 may receive air 160 directed towards vehicle 100 when vehicle 100 is idled or when vehicle 100 is in motion. In examples where vehicle 100 may be idled, a pressure difference between an interior of air intake structure 120 and outside of vehicle 100 may cause air 160 to flow towards an entrance of air intake structure 120 such that air intake structure 120 may receive air 160. In examples where vehicle 100 may be in motion, the pressure difference between the interior of air intake structure 120 and outside of vehicle 100, along with movements of vehicle 100, may cause air 160 to flow towards an entrance of air intake structure 120 such that air intake structure 120 may receive air 160. As a result of air 160 entering air intake structure 120 while vehicle 100 is in motion, a drag of vehicle 100 may be reduced. In some examples, air flow component 106 may include more than one air intake structures. In examples where air flow component 106 includes more than one air intake structures, each air intake structure may be contiguous to an entrance of tunnel structure 130. In some examples, when air flow component 106 includes more than one air intake structures, each air intake structure may receive a respective portion of air 160. Moreover, each air intake structure may be of a respective size and/or shape, etc.

In some examples, a shape of air intake structure 120 may be curved in order to increase an aerodynamic efficiency of an air flow of air 160. In some examples, air intake structure 120 may resemble a funnel, such as a hollow structure including a wide entrance and a narrow exit. In some examples, air intake structure 120 may be curved in a nonlinear manner such that air intake structure 120 resembles a bowl-shaped funnel. In some examples, a width of air intake structure 120 may extend from front wheel 114a to front wheel 114b. A difference between the sizes, such as cross sectional areas, of a wide entrance and a narrow exit of air intake structure 120 may produce a pressure difference between the wide entrance and the narrow exit. The pressure difference between the wide entrance and the narrow exit of air intake structure 120 may cause air 160 to flow in an air flow direction 109 towards tunnel structure 130. In some examples, as air 160 flow in air flow direction 109, a speed of air 160 may increase along air flow direction 109 since a cross sectional area of the interior of air intake structure 120 is decreasing along air flow direction 109. In some examples, the walls of an interior of air intake structure 120 may compress air 160 into first compressed air 162, where first compressed air 162 may flow at a speed higher than a speed of air 160 as first compressed air 162 leaves air intake structure 120.

In some examples, tunnel structure 130 may be positioned in air flow component 106 such that tunnel structure 130 is between front wheels 114a, 114b, and rear wheels 115a, 115b of chassis 112. Tunnel structure 130 may include walls effective to define an entrance or an opening such that tunnel structure 130 may receive air, such as first compressed air 162. In some examples, a shape of tunnel structure 130 may be curved in order to increase an aerodynamic efficiency of an air flow of first compressed air 162. In some examples, tunnel structure 130 may be curved in a linear manner such a cross-sectional area of an interior of tunnel structure 130 decreases along air flow direction 109. In some examples, tunnel structure 130 may be a tube shaped structure, such as a hollow conical frustum, including one or more sections, where each section may be of a different size, such as a diameter or a cross sectional area. For example, focusing on FIG. 1B and FIG. 1C, a cross sectional area of a section 132 of tunnel structure 130 may be greater than a cross sectional area of a section 134 of tunnel structure 130. In some examples, as first compressed air 162 flows in air flow direction 109, a speed of first compressed air 162 may increase along air flow direction 109 since a cross sectional area of the interior of tunnel structure 130 is decreasing along air flow direction 109. In some examples, walls of an interior of tunnel structure 130 may compress first compressed air 162 into second compressed air 164, where second compressed air 164 may flow at a speed higher than a speed of first compressed air 162 as second compressed air 162 enters device 140. In some examples, device 140 may be detached from tunnel structure 130 such that second compressed air 162 may be exhausted as exhausted air 166 to facilitate a reduction of drag experienced by vehicle 100.

As will be described in more detail below, the shape and the varying cross sectional areas of air intake structure 120 and tunnel structure 130 may produce a pressure difference between two or more points along the interiors of air intake structure 120 and tunnel structure 130 in order to drive air, such as air 160, first compressed air 162, second compressed air 164, towards device 140 in air flow direction 109. Also further described below, in addition to pressure difference between points along interiors of air intake structure 120 and tunnel structure 130, magnetic component 105 and heat component 107 may facilitate the drive of air 160 towards device 140 in air flow direction 109.

Device 140 may be an energy generation device configured to generate energy 170 (further described below) and/or manage second compressed air 164. In the example depicted in FIG. 1B, device 140 may include a control unit 142 and/or a wind turbine 150. Control unit 142 may be configured to control and/or manage wind turbine 150. As will be described in more detail below, control unit 142 may control wind turbine 150 to transform a first portion of second compressed air 164 into energy 170. Controller 142 may be further configured to distribute energy 170 among components of vehicle 100. Energy 170 may be electricity effective to power components of vehicle 100, such as charging battery 103, or providing power for motors 102, cooling system 104, and magnetic component 105, etc. A second portion of second compressed air 164 may be exhausted outside of vehicle 100 as exhausted air 166.

In examples where vehicle 100 is a gasoline vehicle, device 140 may be associated with a combustion engine of vehicle 100, such that tunnel structure 130 may be contiguous to the combustion engine. In an example, the combustion engine may receive second compressed air 164 from tunnel structure 130. Second compressed air 164 received at the combustion engine may be an oxidizer for the combustion engine, such that a combustion of fuel and air may occur inside of the combustion engine. In some examples, control unit 142 of device 140 may control an amount of second compressed air 164 being provided to a combustion engine of vehicle 100. In examples where vehicle 100 is a fuel cell vehicle, second compressed air 164 may be a source of oxygen for a fuel cell engine to power motor 102. In examples where vehicle 100 is a hybrid vehicle, wind turbine 150 may provide energy to battery 103 and second compressed air 164 may serve as an oxidizer for a combustion engine of the hybrid vehicle. As will be described in more detail below, an efficiency of wind turbine 150 may be based on a flow speed of second compressed air 164 when device 140 receives second compressed air 164. The flow speed of second compressed air 164 may be based on a size and/or shape of air intake structure 120 and tunnel structure 130, magnetic fields produced by magnetic component 105, and heat provided by heat component 107.

FIG. 2, including FIGS. 2A, 2B, 2C, 2D, and 2E, illustrates vehicle 100 of FIG. 1, a side perspective view of air flow component 106, and a side perspective view of system 101 of FIG. 1, a side cut-away view of system 101 of FIG. 1, and a front view of system 101 of FIG. 1, respectively, with additional detail relating to a drag reduction and electricity generation system, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Focusing on FIG. 2C, air intake structure 120 may receive air 160 directed towards vehicle 100 and/or an entrance 210 of air intake structure 120. In some examples, vehicle 100 may include a filter 204 effective to filter out debris from air 160 prior to air intake structure 120 receiving air 160. Air 160 may enter air intake structure 120 at entrance 210 of air intake structure 120 and may leave at an exit 212 of air intake structure 120 as first compressed air 162. In the example depicted in FIG. 2C, the shape of air intake structure 120 may be curved such that a cross-sectional area of air intake structure 120 may decrease along air flow direction 109, and such that a size or a cross sectional area of entrance 210 may be greater than a size or a cross sectional area of exit 212. The cross sectional area difference between entrance 210 and exit 212 of air intake structure 120 may produce a pressure difference between entrance 210 and exit 212. Since, in the example, entrance 210 is of a relatively large cross sectional area than exit 212, a pressure at entrance 210 may be higher than a pressure at exit 212. The pressure difference between entrance 210 and exit 212 may cause air 160 to flow in air flow direction 109 towards tunnel structure 130.

As mentioned above, at least a portion of magnetic component 105 may be disposed upon at least a portion of air flow component 106. Similarly, at least a portion of air flow component 106 may be disposed upon at least a portion of heat component 107. In the examples depicted in FIGS. 2C, 2D, and/or 2E, magnetic element 220 may be disposed upon at least a portion of air intake structure 120, and at least a portion of air intake structure 120 may be disposed upon heating element 230. Magnetic element 220 may be a part of magnetic component 105 (shown in FIG. 2A) and heating element 230 may be a part of heat component 107 (shown in FIG. 2A). Focusing on FIG. 2E, heating element 230 may be located under a bottom of air intake structure 120. Magnetic element 220 may be located on a surface of air intake structure 120 such that magnetic element 220 may surround, or encompass a top, and at least one side, of air intake structure 120. Focusing on FIG. 2C, magnetic element 220 may be effective to produce a magnetic field 222 and heating element 230 may be effective to provide heat 232. In some examples, magnetic element 220 may be electromagnets including coils, where current may run through the coils to produce magnetic field 222. In some examples, current running through coils of magnetic component 105 may be generated by device 140 (further described below). Magnetic element 220 may be arranged such that a north pole of magnetic field 222 may be directed towards an interior of air intake structure 120. In some examples, heating element 230 may include heat exchanger tubes connected to cooling system 104 of vehicle 100.

In some examples, heating element 230 may include heat exchanger tubes connected to one or more radiators of cooling system 104 or components of vehicle 100. In an example, heated coolant fluid may flow from the radiators or the components to heating element 230. Heating element 230 may provide heat 232 to an interior of air intake structure 120, such as by transferring heat 232 from the heated coolant fluids. As a result of providing heat 232 to the interior of air intake structure 120, a temperature of the heated coolant fluid flowing through heating element 230 may decrease along air flow direction 109. In some examples, heating element 230 may be contiguous to one or more components of vehicle 100, such as motor 102, battery 103, a transmission of vehicle 100, a combustion engine of vehicle 100, etc. In examples where heating element 230 may be contiguous to components of vehicle 100, coolant fluid within heating element 230 may receive heat from the components to increase a temperature of coolant fluid within heating element 230. As a result of the decreasing temperature of coolant fluids within heating element 230 along air flow direction 109, heating element 230 may facilitate a cooling of the one or more components. For example, a first end of heating element 230 near entrance 210, and a second end of heating element 230 near exit 212, may both be contiguous to a combustion engine of vehicle 100. As combustion engine operates, coolant fluid near the first end may be heated to a first temperature. The first temperature of the coolant fluid within heating element 230 may decrease along air flow direction 109, such that the coolant fluid near exit 212 may be at a second temperature. The coolant fluid at the second temperature may facilitate a cooling of the combustion engine since heating element 230 may provide heat at the second temperature that is lower temperature than the first temperature.

Focusing on FIG. 2D, air 160 may flow in a random pattern such as an initial flow 260 after entering air intake structure 120. Heating element 230 may apply heat 232 on air 160 to increase a temperature of air 160. A temperature increase of air 160 may decrease a viscosity of air 160, where a decrease in viscosity may cause air 160 to flow in a relatively orderly pattern such as a laminar flow 262, and may increase a flow speed of air 160. In addition to heat 232, magnetic field 222 may also be applied on air 160 to decrease the viscosity of air 160 such that air 160 may flow in an orderly pattern such as laminar flow 262, and increase the flow speed of air 160. In the example depicted by FIG. 2C, as a result of the application of magnetic field 222 and heat 232, the flow speed of air 160 at entrance 210 may be lower than the flow speed of first compressed air 162 at exit 212. As the flow speed of air 160 increase along air flow direction 109, a pressure along air flow direction 109 in an interior of air intake structure 120 may decrease based on fluid dynamics principles such as the Venturi effect.

Focusing on FIG. 2E, an interior of air intake structure 120 may include one or more fans 270 (including fan 270a, 270b) at initial positions 272 (including positions 272a, 272b). In some examples, initial positions 272 may be near entrance 212, a top, a bottom, one side, and/or both sides of the interior of air intake structure 120. Fans 270 may be attached to a respective actuator, such as a servo motor. Actuators attached to fans 270 may be controlled by device 140. Device 140 may control actuator to move fans 270 from initial positions 272 to positions different from initial positions 272. In an example, device 140 may detect that vehicle 100 is moving at a speed below a speed threshold, such as "10 miles per hour (MPH)". In response to detecting that vehicle 100 is moving at a speed lower than "10 MPH", device 140 may control the actuators to move fans 270 to positions different from initial position 272. For example, device 140 may control the actuators to move fans 270 to positions near a center of the cross-sectional area of entrance 212 such that fans 270 may facilitate a collection of air 160 even if vehicle 100 may be idled or moving a speed lower than "10 MPH". In some examples, device 140 may be configured to detect a temperature of coolant inside of heat element 230. In response to the temperature of the coolant inside of heat element 230 exceeding a particular temperature threshold, device 140 may control the actuators to and/or move fans 270 to positions different from initial positions 272 such that fans 270 may facilitate a cooling of the interior of air intake 120. In some examples, fans 270 may be further positioned in an interior of tunnel structure 130 and similarly, may facilitate collection of first compressed air 162 and cooling of coolant near tunnel structure 130.

As will be described in more detail below, arrangements of heating element 230 relative to other heating elements of heat component 107 may further increase the flow speed of air 160. Similarly, arrangements of magnetic element 220 relative to other magnetic elements of magnetic component 105 may also further increase the flow speed of air 160.

FIG. 3, including FIGS. 3A, 3B, 3C, 3D, and 3E, illustrates vehicle 100 of FIG. 1, a side perspective view of air flow component 106, and a side perspective view of system 101 of FIG. 1, a front cut-away view of system 101 of FIG. 1, and a side cut-away view of system 101 of FIG. 1, respectively, with additional detail relating to a drag reduction and electricity generation system, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Focusing on FIG. 3B, tunnel structure 130 may receive first compressed air 162 from air intake 120. First compressed air 160 may enter tunnel structure 130 at an entrance 310 of tunnel structure 130 and may leave at an exit 312 of tunnel structure 130. In the example depicted in FIG. 3B, a cross-sectional area of tunnel structure 130 may decrease along air flow direction 109, and such that a size or a cross sectional area of entrance 310 may be greater than a size or a cross sectional area of exit 312. In examples where tunnel structure 130 may be defined by hollow conical frustum, a diameter 311 of entrance 310 may be greater than a diameter 313 of exit 312. The difference between cross sectional areas of entrance 310 and exit 312 may produce a pressure difference between entrance 310 and exit 312. Since, in the example, a cross sectional area of entrance 310 is larger than a cross sectional area of exit 312, a pressure at entrance 310 may be higher than a pressure at exit 312. The pressure difference between entrance 310 and exit 312 may cause first compressed air 162 to flow in air flow direction 109 towards device 140.

As mentioned above, at least portion of magnetic component 105 may be disposed upon at least a portion of air flow component 106. Similarly, at least a portion of air flow component 106 may be disposed upon at least a portion of heat component 107. In the examples depicted in FIGS. 3C, 3D, and 3E, magnetic elements 320, 322, 324 may be disposed upon at least a portion of tunnel structure 130, and at least a portion of tunnel structure 130 may be disposed upon heating elements 330, 332. Magnetic elements 320, 322, 324 may each be a part of magnetic component 105 (shown in FIG. 3A) and heating elements 330, 332 may each be a part of heat component 107 (shown in FIG. 3A). Focusing on FIG. 3C, heating element 330, 332 may each be located under a bottom of tunnel structure 130. In some examples, heating elements 330, 332, may be curved such that heating elements 330, 332, may surround, or encompass, at least a portion of the bottom of tunnel structure 130. An amount of heat provided by heating elements 330, 332, may increase or decrease with a surface area of the portion being surrounded by curved heating elements 330, 332. Magnetic elements 320, 322, 324 may each be located on a surface of tunnel structure 130 such that each one of magnetic elements 320, 322, 324 may surround, or encompass a top, and at least one sides, of tunnel structure 130. In some examples, magnetic element 320 may surround a portion of air intake structure 120 and a portion of tunnel structure 130, such that magnetic element 320 may surround a junction of exit 212 of air intake structure 120 and entrance 310 of tunnel structure 130.

Focusing on FIG. 3E, magnetic element 320 may be arranged such that a north pole of magnetic element 320 may be directed away from an interior of tunnel structure 130. Based on the arrangement of magnetic element 220 and magnetic element 320, magnetic field 222 may be directed from magnetic element 220 (which may be disposed upon air intake structure 120) towards magnetic element 320 through the interior of tunnel structure 130, as depicted by FIG. 3E. The direction of magnetic field 222 may facilitate a reduction of viscosity of first compressed air 162 in order to cause first compressed air 162 to flow in air flow direction 109, and in order to increase the flow speed of first compressed air 162, such that laminar flow 262 of first compressed air 162 may be maintained and/or enhanced.

Similarly, magnetic element 322 may be arranged such that a north pole of magnetic element 322 may be directed towards the interior of tunnel structure 130. Magnetic element 324 may be arranged such that a north pole of magnetic element 320 may be directed away from the interior of tunnel structure 130. Based on the arrangement of magnetic elements 322, 324, a magnetic field 326 may be produced and directed from magnetic element 322 towards magnetic element 324 through the interior of tunnel structure 130, as depicted by FIG. 3E. The direction of magnetic field 326 may facilitate a reduction of viscosity of first compressed air 162 in order to cause first compressed air 162 to flow in air flow direction 109 and in order to increase the flow speed of first compressed air 162, such that laminar flow 262 of first compressed air 162 may be maintained and/or enhanced. As will be further described below, an arrangement of different magnetic elements may facilitate production of pressure differences along interiors of air intake structure 120 and/or tunnel structure 130 in order to drive air 160 and/or first compressed air 162 towards device 140. In some examples, addition magnetic elements may be coupled to air intake 120 and/or tunnel 130, and may be positioned in an arbitrary arrangement.

Focusing on FIGS. 3C and 3E, heating elements 330, 332 may include heat exchanger tubes connected to one or more radiators of cooling system 104 or components of vehicle 100. Heated coolant fluid may flow from the radiators or the components to heating elements 330, 332. Heating elements 330, 332 may provide heat 331, 333 to an interior of tunnel structure 130, such as by transferring heat 331, 333 from the heated coolant fluids. As a result of providing heat 331, 333 to the interior of tunnel structure 130, a temperature of the heated coolant fluid flowing through heating elements 330, 332 may decrease along air flow direction 109. In some examples, heating elements 330, 332 may each be contiguous to one or more components of vehicle 100, such as motor 102, battery 103, a transmission of vehicle 100, a combustion engine of vehicle 100, etc. In examples where heating elements 330, 332 may each be contiguous to components of vehicle 100, coolant fluid within heating elements 330, 332 may receive heat from the components to increase a temperature of the coolant fluid within heating elements 330, 332. As a result of the decreasing temperature of coolant fluids within heating elements 330, 332 along air flow direction 109, heating elements 330, 332 may facilitate a cooling of the one or more components.

In some examples, heating elements 330, 332 may be connected to each other such that heating element 330 may receive heated coolant fluid prior to heating element 332 receiving the heated coolant fluid. In examples where heating elements 330, 332 are connected to each other, a temperature of heat 331 provided by heating element 330 may be higher than a temperature of heat 333 provided by heating element 332. Since heat 331 is of a higher temperature than heat 333, heat 331 may reduce the viscosity of first compressed air 162 more effectively than heat 333. The temperature difference between heat 331, 333 may drive first compressed air 162 to flow in air flow direction 109 and may increase a flow speed of first compressed air 162, such that laminar flow 262 of first compressed air 162 may be maintained and/or enhanced. In some examples, heat 232, 331, 333 may also increase a temperature of the interiors of air intake structure 120 and/or tunnel structure 130. The increased interior temperature may reduce an attraction force between air molecules of first compressed air 162 and surface molecules of the interiors of air intake structure 120 and tunnel structure 130. The reduced attraction force may cause a reduction of friction between air molecules of air 160 and inside walls of the interiors of air intake structure 120 and tunnel structure 130, which may lead to an increase flow speed and laminar flow of first compressed air 162.

As a result of the application of magnetic fields 222, 326 and heat 331, 333, the flow speed of first compressed air 162 at entrance 310 may be lower than the flow speed of second compressed air 164 at exit 312. As the flow speed of first compressed air 162 increase along air flow direction 109, pressure along air flow direction 109 in an interior of tunnel structure 130 may decrease based on fluid dynamics principles such as the Venturi effect. As will be described in more detail below, as a result of driving first compressed air 162 to flow faster along air flow direction 109, the increased flow speed of second compressed air 164 may facilitate an improvement of an efficiency of device 140.

FIG. 4 illustrates the example system 100 of FIG. 1 with additional detail relating to a device of a drag reduction and electricity generation system, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity.

As depicted in FIG. 4, device 140 may include control unit 142 and wind turbine 150. Wind turbine 150 may be configured to transform at least a portion of second compressed air 164 into energy 170. Wind turbine 150 may include at least a rotor 410, a shaft 412, a shaft 413, a gearbox 416, and/or a generator 420. Rotor 410 may include one or more blades 411, and rotor 410 may be contiguous to shaft 412. Shaft 412 may be contiguous to gearbox 416, where gearbox 416 may include one or more gears 417a, 417b, and each gear may be of a respective size. Gearbox 416 may be contiguous to shaft 413, where shaft 413 may be contiguous to generator 420. In the example depicted, shaft 412 may be contiguous to gear 417a and shaft 413 may be contiguous to gear 417b. In some examples, wind turbine 150 may include additional components such as a yaw motor, a brake, a wind vane, etc.

In the example depicted in FIG. 4, device 140 or wind turbine 150 may receive second compressed air 164 from tunnel structure 130. Second compressed air 160 may exert a force on blades 411 to cause rotor 410 to rotate in a rotation direction 414. In response to rotor 410 rotating in rotation direction 414, shaft 412 may also rotate in rotation direction 414. A rotation of shaft 412 may cause gear 417a to rotate at a first rotation speed, where gear 417a may rotate in a same direction as shaft 412. Gear 417a may be in communication with gear 417b, where the rotation gear 417a may cause gear 417b to rotate in a rotation direction opposite from rotation direction 414. In the example depicted in FIG. 4, gear 417a may be larger than gear 417b such that gear 417b may rotate at a second rotation speed higher than the first rotation speed of 417a. A rotation of gear 417b may cause shaft 413 to rotate in a same rotation direction of gear 417b, where shaft 413 may rotate at a speed higher than a rotation speed of shaft 412. A rotation of shaft 413 may cause generator 420 to rotate with shaft 413, where a rotation of generator 420 may produce energy 170.

Generator 420 or wind turbine 150 may distribute energy 170 to one or more components of vehicle 100 through one or more wires 422. In an example, wind turbine 150 may distribute energy 170 to battery 103 of vehicle 100 in order to charge battery 103. In another example, wind turbine 150 may distribute energy 170 to cooling system 104 to provide electricity to units, such as air conditioning units, of cooling system 104. In another example, wind turbine 150 may distribute energy 170 to magnetic component 105 to provide current to electromagnets of magnetic component 105 such that magnetic component 105 may produce magnetic fields. Energy 170 may also be distributed within vehicle 100 to provide power for a lighting system, radio, or various electronics, of vehicle 100.

Control unit 142 may include a processor 430, a memory 432, and/or one or more sensors 434, configured to be in communication with each other. Processor 430 may be configured to control operations of sensors 434 and/or wind turbine 150. Processor 430 may be further configured to manage data stored in memory 432, where memory 432 may include a database 436 effective to store data relating to wind turbine 150. Sensors 434 may include one or more sensing mechanisms effective to detect performance of wind turbine 150 such that control unit 142 may manage second compressed air 164. In some examples, control unit 142 may be configured to be in communication with components such as a temperature sensor, a tachometer (such as revolutions per minute indicator), a humidity sensor, a computer, an engine control unit, body control module, etc. associated with vehicle 100, such that data may be exchanged among control unit 142 and the components to facilitate an implementation of system 101.

In an example, sensors 434 may include an anemometer configured to measure a speed of second compressed air 164. Processor 430 may be configured to retrieve the speed of second compressed air 164 detected by sensors 434, and may record the speed of second compressed air 164 at various times and situations in database 436 of memory 432. Sensors 434 may further include an energy sensor configured to measure an amount of energy, which may be associated with energy 170, generated by wind turbine 150. Processor 430 may be configured to retrieve the amount of energy generated by wind turbine 150, and may record amounts of energy 170 under various times and situations in database 436 of memory 432. In an example, processor 430 may be configured to compare and/or evaluate the speed of second compressed air 164 and/or the amount of energy generated by wind turbine 150 to evaluate an efficiency of wind turbine 150. Processor 430 may be further configured to determine a rotation speed of rotor 410 based on the speed of second compressed air 164. Processor 430 may determine whether the rotation speed of rotor 410 exceeds a threshold. If the rotation speed of rotor 410 exceeds the threshold, processor 430 may facilitate an exhaustion of at least a portion of air 160 through an exhaust pipe 402 of vehicle 100, such that second compressed air 164 may be exhausted as exhausted air 166. In examples where wind turbine 150 includes a brake, if the rotation speed of rotor 410 exceeds the threshold, processor 430 may generate a signal or command to activate the brake to terminate or slow down the rotation of rotor 410, and facilitate exhaustion of second compressed air 164 through exhaustion pipe 402. In some examples, control unit 142 may include mechanisms to detect an air-fuel ratio of a mixture of air and fuel in a combustion engine, and may regulate an amount of second compressed air 164 based on an evaluation of the air-fuel ratio. As will be further described below, controller 142 may be configured to control components in addition to exhaustion pipe 402 to regulate second compressed air 164.

Figure 5:
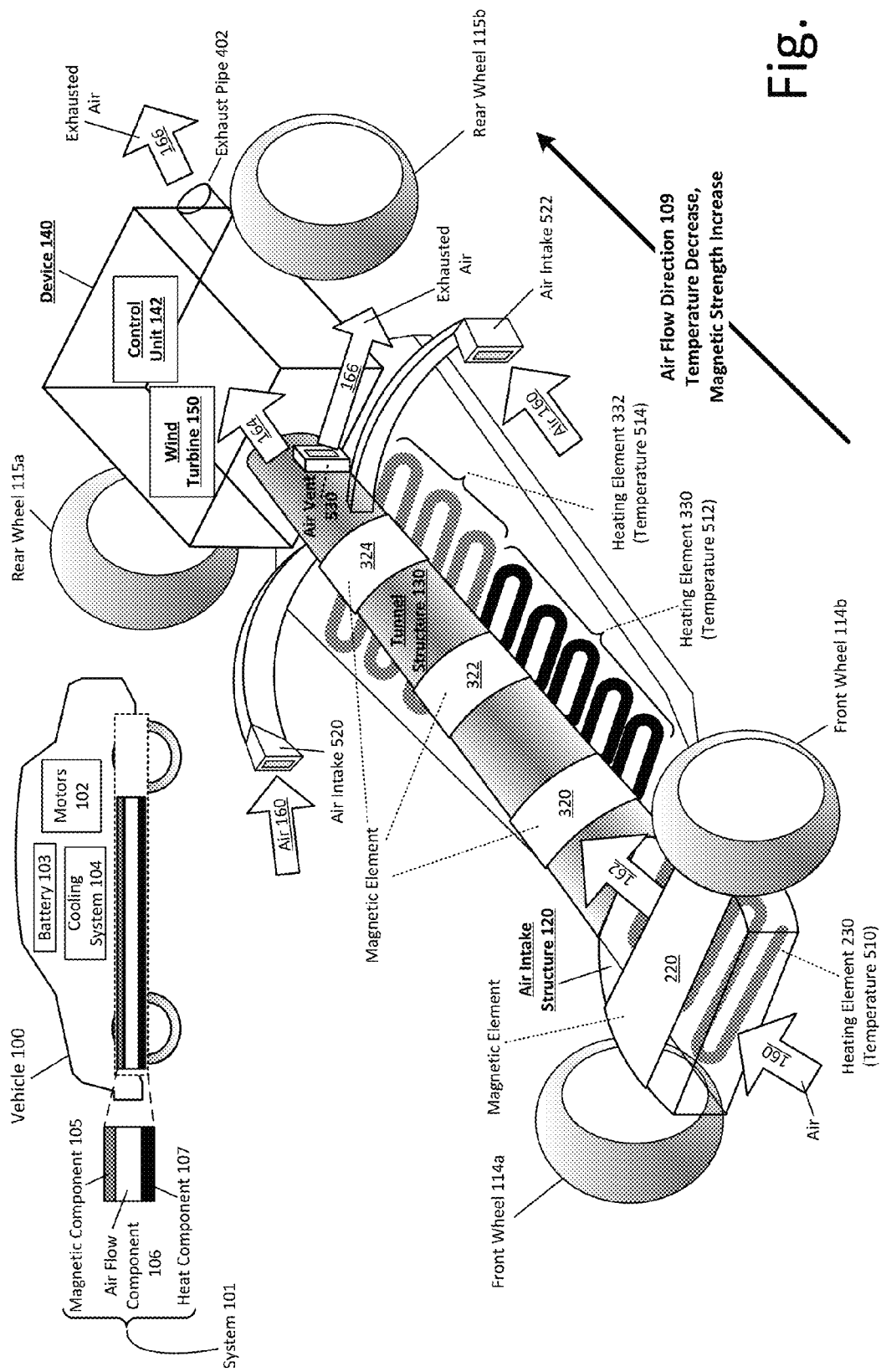
FIG. 5 illustrates the vehicle of FIG. 1 with additional detail relating to a drag reduction and electricity generation system.

FIG. 5 illustrates the example system 100 of FIG. 1 with additional detail relating to a drag reduction and electricity generation system, arranged in accordance with at least some embodiments described herein. FIG. 5 is substantially similar to system 100 of FIG. 1, with additional details. Those components in FIG. 5 that are labeled identically to components of FIG. 1 will not be described again for the purposes of clarity.

As mentioned above, temperature differences between two points along air flow direction 109 may drive air 160, first compressed air 162, and/or second compressed air 164, towards device 140 due to pressure difference. In the example depicted by FIG. 5, a temperature 510 of heat provided by heating element 230 may be greater than a temperature 512 of heat provided by heating element 330. As a result of temperature 510 being greater than temperature 512, air 160 may be driven from air intake structure 120 towards tunnel structure 130 based on the pressure difference produced by a difference between temperatures 510, 512. Similarly, temperature 512 of heat provided by heating element 330 may be greater than a temperature 514 of heat provided by heating element 332. As a result of temperature 512 being greater than temperature 514, first compressed air 162 may be driven from tunnel structure 130 towards device 140 based on the pressure difference produced by a difference between temperatures 512, 514.

As mentioned above, coolant fluid may flow within heating elements 230, 330, 332. In an example, heating element 230 may receive coolant fluid from one or more radiators of vehicle 100. The coolant fluid may flow from heating element 230 to heating element 330, then may further flow from heating element 330 to heating element 332. As shown in the example in FIG. 5, temperature 514 may be lower than temperature 512, and temperature 512 may be lower than temperature 210. Since temperature 514 is a lowest temperature among temperatures 510, 512, 514, heat provided by heating element 332 at temperature 514 may be used as a source to cool components of vehicle 100, such as motors 102, battery 130, etc. In some examples, vehicle 100 may not include radiators and coolant fluids within heating elements may be heated by the components of vehicle 100. In examples where vehicle 100 do not include radiators, cooling system 104 may be implemented with a combination of heating elements 230, 330, 332, air intake structure 120, tunnel structure 130, and/or one or more fans associated with air intake structure 120 (shown above in FIG. 2), such that the combination may perform as a system effective to cool components of vehicle 100.

As mentioned above, an arrangement of different magnetic elements may facilitate production of pressure differences between points along air intake structure 120 and/or tunnel structure 130 in order to drive air 160, first compressed air 162, and/or second compressed air 164, towards device 140. In the example depicted in FIG. 5, a magnetic strength of magnetic element 220 may be weakest among the magnetic strengths of magnetic elements 220, 320, 322, 324. A magnetic strength of magnetic element 324 may be strongest among the magnetic strengths of magnetic elements 220, 320, 322, 324. Magnetic strengths of magnetic elements 220, 324, 322, 324 may increase along air flow direction 109 such that a pressure within air intake structure 120 and/or tunnel structure 130 may decrease along air flow direction 109. As a result of decreasing pressure along air flow direction 109, air 160, first compressed air 162, and/or second compressed air 164, may be driven towards device 140. In some examples, positions of magnetic elements 220, 320, 322, 324 may differ from the example depicted in FIG. 5. For example, magnetic element 320 may be positioned at a junction of air intake structure 120 and tunnel structure 130.

In some examples, system 101 may further include additional intakes such as air intake 520 and air intake 522. In examples where vehicle 100 may be idled, in addition to air intake 120, air intakes 520, 522 may also receive air 160 such that system 101 may operate with sufficient amount of incoming air. In some examples, system 101 may further include one or more air vents, such as an air vent 530. Air vent 530 may be an aperture defined on a surface of tunnel structure 130, and may include an electronically or a mechanically controlled door, such as a gate or flap. Air vent 530 may be controlled by control unit 142 of device 140. As mention above, control unit 142 may control an exhaustion of a portion of second compressed air 164 through exhaust pipe 402 such that second compressed air 164 may be exhausted as exhausted air 166. Control unit 142 may be further configured to control the exhaustion of exhausted air 166 through air vent 530 in situations where control unit 142 need to control wind turbine 150 under situations mentioned above. For example, if an air-fuel ratio detected by control unit 142 indicates an abundance of air, control unit 142 may operate air vent 530, such as by opening a gate of air vent 530, to exhaust second compressed air 164 as exhausted air to maintain an appropriate air-fuel ratio.

A system in accordance with the present disclosure may improve vehicle performance by reducing a drag of a vehicle in motion. The system in accordance with the present disclosure also may utilize available space in a chassis of electric vehicles such that the space would not be unused. The system in accordance with the present disclosure may also reduce a drag of vehicles and transform incoming air into energy to enhance energy efficiency of vehicles. For example, by utilizing magnetic elements described above, air received by the system in accordance with the present disclosure may be driven towards a wind turbine at a faster pace such that an efficiency of the wind turbine may be improved. Similarly, by utilizing heating elements described above, air received by the system in accordance with the present disclosure may be driven towards the wind turbine at a faster pace such that the efficiency of the wind turbine may be improved. Further, the heating elements described above may utilize heat provided from other parts of the vehicle such that the energy associated with the heat may be reused.

Figure 6:
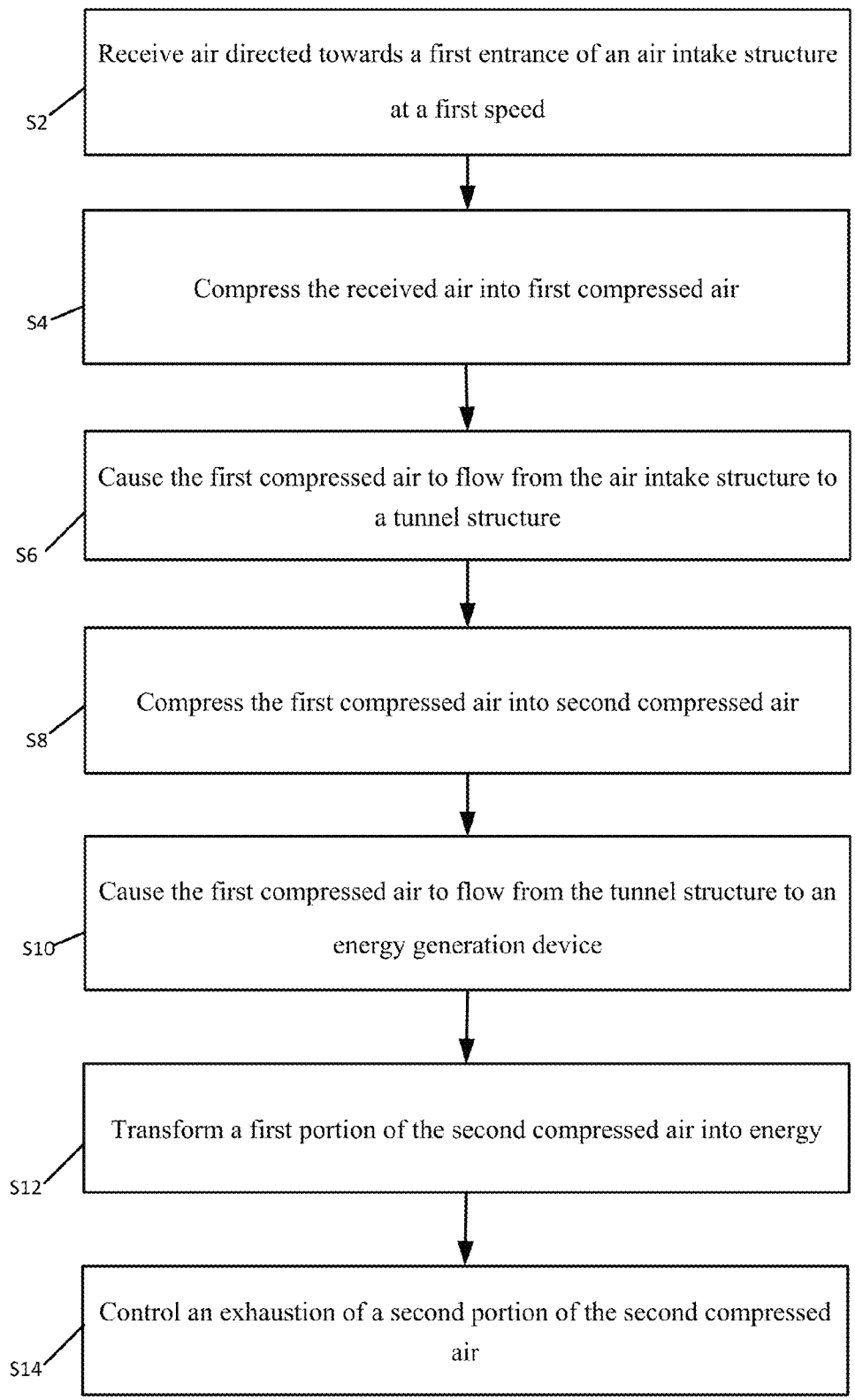
FIG. 6 illustrates a flow diagram for an example process to implement a vehicle drag reduction and electricity generation system.

FIG. 6 illustrates a flow diagram for an example process to implement vehicle drag reduction and electricity generation system, arranged in accordance with at least some embodiments presented herein. The process in FIG. 6 could be implemented using, for example, system 100 discussed above. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

Processing may begin at block S2, "Receive air directed towards a first entrance of an air intake structure at a first speed". At block S2, a vehicle may receive air directed towards a first entrance of an air intake structure at a first speed. The air intake structure may be disposed upon a chassis of the vehicle. The air intake structure may include the first entrance and a first exit, where a first size of the first entrance may be greater than a second size of the first exit. The air intake structure may be curved in a nonlinear manner.

Processing may continue from block S2 to block S4, "Compress the received air into first compressed air". At block S4, the vehicle may compress the received air into first compressed air. A first difference between the first size of the first entrance and the second size of the first exit may be effective to cause the compression of the received air into the first compressed air. A second speed of the first compressed air may be greater than the first speed of the received air. The first difference between the first size of the first entrance and the second size of the first exit may be further effective to cause the second speed to be greater than the first speed. In some examples, the vehicle may produce one or more magnetic fields. The vehicle may apply the one or more magnetic fields to the received air to increase the first speed of the received air. In some examples, the vehicle may further apply heat at a first temperature to the received air at the air flow component to increase a flow speed of the received air.

Processing may continue from block S4 to block S6, "Cause the first compressed air to flow from the air intake structure to a tunnel structure". At block S6, the vehicle may cause the first compressed air to flow from the air intake structure to a tunnel structure. The tunnel structure may be contiguous to the air intake structure. The tunnel structure may include a second entrance and a second exit. The tunnel structure may be disposed upon the chassis of the vehicle. The tunnel structure may be curved in a linear manner. A third size of the second entrance may be greater than a fourth size of the second exit.

Processing may continue from block S6 to block S8, "Compress the first compressed air into second compressed air". At block S8, the vehicle may compress the first compressed air into second compressed air. A second difference between the third size of the second entrance and the fourth size of the second exit may be effective to cause the compression of the first compressed air into the second compressed air. A third speed of the second compressed air may be greater than the second speed of the first compressed air. The second difference between the third size of the second entrance and the fourth size of the second exit may be further effective to cause the third speed to be greater than the second speed. In some examples, the vehicle may apply the one or more magnetic fields to the first compressed air to increase the second speed of the first compressed air. In some examples, the vehicle may further apply heat at a second temperature to the first compressed air to increase the second speed of the first compressed air.

Processing may continue from block S8 to block S10, "Cause the first compressed air to flow from the tunnel structure to an energy generation device". At block S10, the vehicle may cause the first compressed air to flow from the tunnel structure to an energy generation device. The energy generation device may be configured to be in communication with the tunnel structure.

Processing may continue from block S10 to block S12, "Transform a first portion of the second compressed air into energy". At block S12, the vehicle may transform a first portion of the second compressed air into energy.

Processing may continue from block S12 to block S14, "Control an exhaustion of a second portion of the second compressed air". At block S14, the vehicle may control an exhaustion of a second portion of the second compressed air. In some examples, the vehicle may transmit the energy to a battery of the vehicle.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    an air intake structure including a first entrance and a first exit, the air intake structure being effective to receive air directed towards the first entrance at a first speed, the air intake structure is curved in a nonlinear manner, a first size of the first entrance is greater than a second size of the first exit, a first difference between the first size and the second size is effective to compress the received air into first compressed air of a second speed, and the first difference between the first size and the second size is further effective to cause the second speed to be greater than the first speed;
    a tunnel structure contiguous to the air intake structure, the tunnel structure including a second entrance and a second exit, the tunnel structure is curved in a linear manner, the tunnel structure being effective to receive the first compressed air from the air intake structure at the second speed, a third size of the second entrance is greater than a fourth size of the second exit, a second difference between the third size and the fourth size is effective to compress the first compressed air into second compressed air of a third speed, and the second difference between the third size and the fourth size is further effective to cause the third speed to be greater than the second speed;

an energy generation device configured to be in communication with the tunnel structure, the energy generation device being configured to:
receive the second compressed air from the tunnel structure;
transform a first portion of the second compressed air into energy; and
control an exhaustion of a second portion of the second compressed air.

2. The system of claim 1, wherein the air intake structure and the tunnel structure are part of an air flow component, the system further comprising a magnetic component disposed upon at least a portion of the air flow component, the magnetic component being effective to:
produce one or more magnetic fields;
apply the one or more magnetic fields to the received air to increase the first speed of the received air; and
apply the one or more magnetic fields to the first compressed air to increase the second speed of the first compressed air.

3. The system of claim 2, further comprising a heat component, wherein at least a portion of the air flow component is disposed upon the heat component, the heat component being effective to:
provide heat of a first temperature to an interior of the air intake structure, wherein an application of the heat of the first temperature to the received air is effective to increase the first speed of the received air; and
provide heat of a second temperature to an interior of the tunnel structure, wherein an application of the heat of the second temperature to the first compressed air is effective to increase the second speed of the first compressed air.

4. The system of claim 2, wherein:
the magnetic component include at least a first magnetic element and a second magnetic element;
the first magnetic element is arranged such that a first north pole of the first magnetic element is directed towards a first direction;
the second magnetic element is arranged such that a second north pole of the second magnetic element is directed towards a second direction different from the first direction; and
the arrangements of the first and second magnetic elements are effective to facilitate the increase of the first speed of the received air and the second speed of the first compressed air.

5. The system of claim 1, wherein the air intake structure and the tunnel structure are part of an air flow component, the system further comprises a heat component, wherein at least a portion of the air flow component is disposed upon the heat component, the heat component being effective to:
provide heat of a first temperature to an interior of the air intake structure, wherein an application of the heat of the first temperature to the received air is effective to increase the first speed of the received air; and
provide heat of a second temperature to an interior of the tunnel structure, wherein an application of the heat of the second temperature to the first compressed air is effective to increase the second speed of the first compressed air.

6. The system of claim 5, wherein:
the heat component includes at least a first heating element and a second heating element;
the first heat element being effective to provide the heat at the first temperature;
the second heat element being effective to provide the heat at the second temperature, wherein the first temperature is higher than the second temperature; and
a temperature difference between the first temperature and the second temperature is effective to facilitate the increase of the first speed of the received air and the second speed of the first compressed air.

7. The system of claim 1, wherein the energy generation device includes a wind turbine, the wind turbine being effective to:
receive the second compressed air, wherein the second compressed air is effective to cause one or more components of the wind turbine to rotate; and
transform the first portion of the second compressed air into the energy based on the rotation of the one or more components of the wind turbine.

8. The system of claim 1, further comprises:
at least one fan positioned in a first position;
at least one actuator attached to the at least one fan;
wherein the energy generation device is further configured to:
detect a speed of a vehicle;
compare the speed of the vehicle with a speed threshold; and
in response to the speed of the vehicle being less than the speed threshold, control the at least one actuator to move the at least one fan to a second position different from the first position.

9. The system of claim 1, further comprises:
at least one fan positioned in a first position;
at least one actuator attached to the at least one fan;
wherein the energy generation device is further configured to:
detect a temperature of coolant fluid within a heating element;
compare the temperature of the coolant fluid with a temperature threshold; and
in response to the temperature of the coolant fluid being greater than the temperature threshold, control the at least one actuator to move the at least one fan to a second position different from the first position.

10. The system of claim 1, further comprising a combustion engine contiguous to the tunnel structure, the combustion engine being configured to receive a third portion of the second compressed air.

11. The system of claim 1, wherein the tunnel structure further includes at least one air vent, the air vent includes a gate, and the energy generation device is further configured to:
determine an amount of the second compressed air received from the tunnel structure; and
based on the determined amount, control the gate of the air vent to exhaust the second portion of the second compressed air.

12. A vehicle comprising:
a battery;
a motor configured to be in communication with the battery;

a chassis including:
  a frame;
  a set of front wheels coupled to the frame;
  a set of rear wheels coupled to the frame; and
  a transmission coupled to at least one of the set of front wheels and the set of rear wheels;
an air intake structure including a first entrance and a first exit, the air intake structure is disposed upon a first part of the frame of the chassis, the air intake structure is positioned between a first wheel and a second wheel among the set of front wheels, the air intake structure being effective to receive air directed towards the first entrance at a first speed, the air intake structure is curved in a nonlinear manner, a first size of the first entrance is greater than a second size of the first exit, a first difference between the first size and the second size is effective to compress the received air into first compressed air of a second speed, and the first difference between the first size and the second size is further effective to cause the second speed to be greater than the first speed;
a tunnel structure contiguous to the air intake structure, the tunnel structure including a second entrance and a second exit, the tunnel structure is disposed upon a second part of the frame of the chassis, the tunnel structure is positioned between the set of front wheels and the set of rear wheels, the tunnel structure is curved in a linear manner, the tunnel structure being effective to receive the first compressed air from the air intake structure at the second speed, a third size of the second entrance is greater than a fourth size of the second exit, a second difference between the third size and the fourth size is effective to compress the first compressed air into second compressed air of a third speed, and the second difference between the third size and the fourth size is further effective to cause the third speed to be greater than the second speed;
an energy generation device configured to be in communication with the tunnel structure, the energy generation device being configured to:
  receive the second compressed air from the tunnel structure;
  transform a first portion of the second compressed air into energy; and
  control an exhaustion of a second portion of the second compressed air.

13. The vehicle of claim 12, wherein the air intake structure and the tunnel structure are part of an air flow component, the vehicle further comprising a magnetic component disposed upon at least a portion of the air flow component, the magnetic component being effective to:
  produce one or more magnetic fields; and
  apply the one or more magnetic fields to the received air to increase the first speed of the received air;
  apply the one or more magnetic fields to the first compressed air to increase the second speed of the first compressed air, wherein:
    the magnetic component includes at least a first magnetic element and a second magnetic element;
    the first magnetic element is arranged such that a first north pole of the first magnetic element is directed towards a first direction;
    the second magnetic element is arranged such that a second north pole of the second magnetic element is directed towards a second direction different from the first direction; and
    the arrangements of the first and second magnetic elements is effective to facilitate the increase of the first speed of the received air and the second speed of the first compressed air.

14. The vehicle of claim 13, further comprising a heat component, wherein:
  at least a portion of the air flow component is disposed upon the heat component;
  the heat component includes at least a first heating element and a second heating element;
  the first heat element being effective to provide heat at a first temperature to an interior of the air intake structure, wherein an application of the heat of the first temperature to the received air is effective to increase a flow speed of the received air;
  the second heat element being effective to provide heat at a second temperature to an interior of the tunnel structure, wherein an application of the heat of the second temperature to the first compressed air is effective to increase the second speed of the first compressed air, and the first temperature is higher than the second temperature; and
  a temperature difference between the first temperature and the second temperature is effective to increase of the first speed of the received air and the second speed of the first compressed air.

15. The vehicle of claim 12, further comprising a heat component, wherein:
  at least a portion of the air flow component is disposed upon the heat component;
  the heat component includes at least a first heating element and a second heating element;
  the first heat element being effective to provide heat at a first temperature to an interior of the air intake structure, wherein an application of the heat of the first temperature to the received air is effective to increase a flow speed of the received air;
  the second heat element being effective to provide heat at a second temperature to an interior of the tunnel structure, wherein an application of the heat of the second temperature to the first compressed air is effective to increase the second speed of the first compressed air, and the first temperature is higher than the second temperature; and
  a temperature difference between the first temperature and the second temperature is effective to increase of the first speed of the received air and the second speed of the first compressed air.

16. The vehicle of claim 12, wherein:
  the first heat element is contiguous to one or more components of the vehicle, the one or more components include at least the battery, the motor, and the transmission;
  the second heat element is contiguous to the one or more components;
  the heat at the first temperature is received at the first heat element from the one or more components; and
  the heat at the second temperature is transferred to the one or more components from the second heat element, wherein the heat at the second temperature is effective to facilitate a cooling of the one or more components based on the first temperature being higher than the second temperature.

17. The vehicle of claim 12, wherein the energy generation device includes a wind turbine, the wind turbine being effective to:

receive the second compressed air, wherein the second compressed air is effective to cause one or more components of the wind turbine to rotate;
transform the first portion of the second compressed air into the energy based on the rotation of the one or more components of the wind turbine; and
transmit the energy to the battery of the vehicle.

18. The vehicle of claim 12, further comprises:
at least one fan positioned in a first position;
at least one actuator attached to the at least one fan;
wherein the energy generation device is further configured to:
  detect a speed of a vehicle;
  compare the speed of the vehicle with a speed threshold; and
  in response to the speed of the vehicle being less than the speed threshold, control the at least one actuator to move the at least one fan to a second position different from the first position.

19. The vehicle of claim 12, further comprises:
at least one fan positioned in a first position;
at least one actuator attached to the at least one fan;
wherein the energy generation device is further configured to:
  detect a temperature of coolant fluid within a heating element;
  compare the temperature of the coolant fluid with a temperature threshold; and
  in response to the temperature of the coolant fluid being greater than the temperature threshold, control the at least one actuator to move the at least one fan to a second position different from the first position.

20. A method to generate electrical energy, the method comprising:
  receiving, by a vehicle, air directed towards a first entrance of an air intake structure at a first speed, the air intake structure is disposed upon a chassis of the vehicle, the air intake structure includes the first entrance and a first exit, the air intake structure is curved in a nonlinear manner, a first size of the first entrance is greater than a second size of the first exit;
  compressing, by the vehicle, the received air into first compressed air, wherein a first difference between the first size of the first entrance and the second size of the first exit is effective to cause the compression of the received air into the first compressed air, a second speed of the first compressed air is greater than the first speed of the received air, and the first difference between the first size of the first entrance and the second size of the first exit is further effective to cause the second speed to be greater than the first speed;
  causing, by the vehicle, the first compressed air to flow from the air intake structure to a tunnel structure, wherein the tunnel structure is contiguous to the air intake structure, the tunnel structure including a second entrance and a second exit, the tunnel structure is disposed upon the chassis of the vehicle, the tunnel structure is curved in a linear manner, a third size of the second entrance is greater than a fourth size of the second exit;
  compressing, by the vehicle, the first compressed air into second compressed air, wherein a second difference between the third size of the second entrance and the fourth size of the second exit is effective to cause the compression of the first compressed air into the second compressed air, a third speed of the second compressed air is greater than the second speed of the first compressed air, and the second difference between the third size of the second entrance and the fourth size of the second exit is further effective to cause the third speed to be greater than the second speed;
  causing, by the vehicle, the first compressed air to flow from the tunnel structure to an energy generation device, wherein the energy generation device is configured to be in communication with the tunnel structure;
  transforming, by the vehicle, a first portion of the second compressed air into energy; and
  controlling, by the vehicle, an exhaustion of a second portion of the second compressed air.

21. The method of claim 20, further comprising:
producing one or more magnetic fields; and
applying the one or more magnetic fields to the received air to increase the first speed of the received air;
applying the one or more magnetic fields to the first compressed air to increase the second speed of the first compressed air.

22. The method of claim 21, further comprising:
applying heat at a first temperature to the received air at the air flow component to increase a flow speed of the received air; and
applying heat at a second temperature to the first compressed air to increase the second speed of the first compressed air.

23. The method of claim 20, further comprising:
applying heat at a first temperature to the received air at the air flow component to increase a flow speed of the received air;
applying heat at a second temperature to the first compressed air to increase the second speed of the first compressed air.

* * * * *